US006898603B1

United States Patent
Petculescu et al.

(10) Patent No.: US 6,898,603 B1
(45) Date of Patent: May 24, 2005

(54) MULTI-DIMENSIONAL DATA STRUCTURE CACHING

(75) Inventors: Cristian Petculescu, Redmond, WA (US); Amir Netz, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 676 days.

(21) Appl. No.: 09/418,705

(22) Filed: Oct. 15, 1999

(51) Int. Cl.[7] .............................................. G06F 17/30
(52) U.S. Cl. ............................. 707/101; 707/2; 707/3; 707/104
(58) Field of Search ........................... 707/3, 16, 2, 4, 707/100–104, 200

(56) References Cited

U.S. PATENT DOCUMENTS

| | | | | |
|---|---|---|---|---|
| 5,794,229 A | * | 8/1998 | French et al. | 705/35 |
| 5,799,300 A | * | 8/1998 | Agrawal et al. | 707/5 |
| 5,832,475 A | * | 11/1998 | Agrawal et al. | 707/1 |
| 5,890,151 A | * | 3/1999 | Agrawal et al. | 707/1 |
| 5,901,287 A | * | 5/1999 | Bull et al. | 395/200.48 |
| 5,905,985 A | * | 5/1999 | Malloy et al. | 707/100 |
| 5,918,225 A | * | 6/1999 | White et al. | 707/1 |
| 5,918,232 A | * | 6/1999 | Pouschine et al. | 707/103 |
| 5,926,818 A | * | 7/1999 | Malloy et al. | 707/100 |
| 5,926,820 A | * | 7/1999 | Agrawal et al. | 707/200 |
| 5,943,668 A | * | 8/1999 | Malloy et al. | 707/3 |
| 5,978,796 A | * | 11/1999 | Malloy et al. | 707/3 |
| 5,995,943 A | * | 11/1999 | Bull et al. | 705/14 |
| 6,105,033 A | * | 8/2000 | Levine | 707/101 |
| 6,122,636 A | * | 9/2000 | Malloy et al. | 707/102 |
| 6,182,060 B1 | * | 1/2001 | Hedgcock et al. | 705/1 |
| 6,182,061 B1 | * | 1/2001 | Matsuzawa et al. | 707/2 |
| 6,279,033 B1 | * | 8/2001 | Selvarajan et al. | 709/217 |

* cited by examiner

*Primary Examiner*—Jean M. Corrielus
(74) *Attorney, Agent, or Firm*—Woodcock Washburn LLP

(57) ABSTRACT

End-user specified insertion of elements into a database cache is disclosed. The systems and methods of the invention define an efficient mechanism allowing a user with knowledge of anticipated behavior of a database application program to specify cell data that is cached before it is required by the application program. The system determines an appropriate set of cell data to be cached that meets the end-users specification and that can be obtained with a minimum of round-trips to a database server. In a multidimensional database, the system determines a maximum depth level for each user specified dimension member set. A target set of dimension members is formed comprising the set of members at the maximum level that have a common ancestor member. The cell data representing the cross product of the target sets is then obtained and cached.

30 Claims, 7 Drawing Sheets

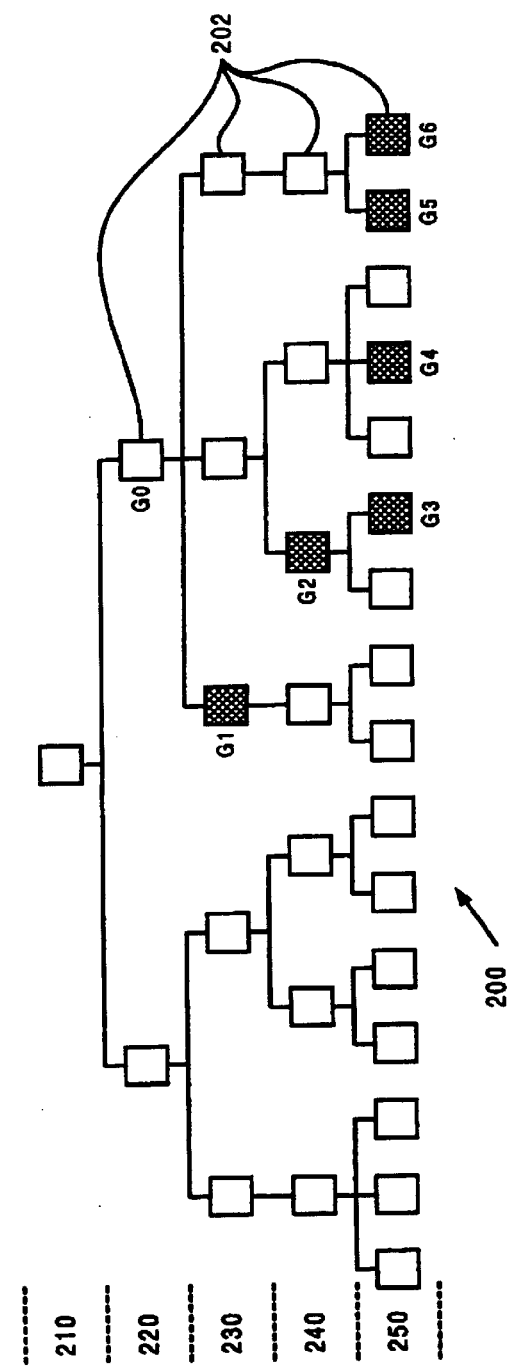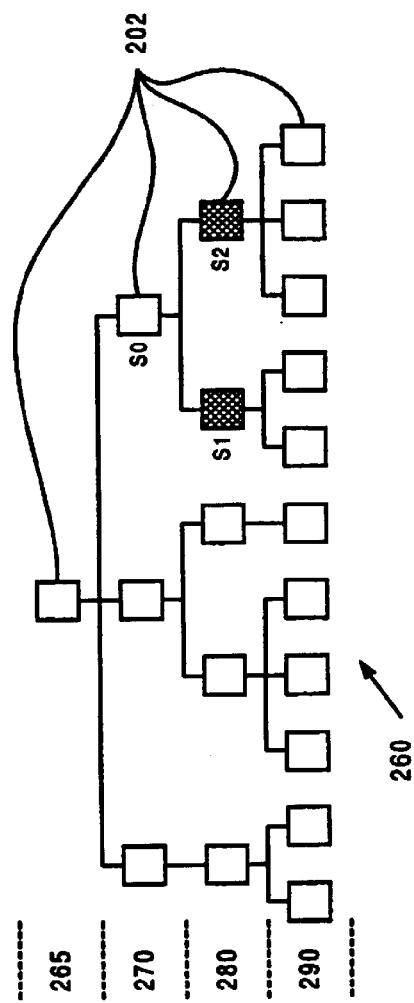

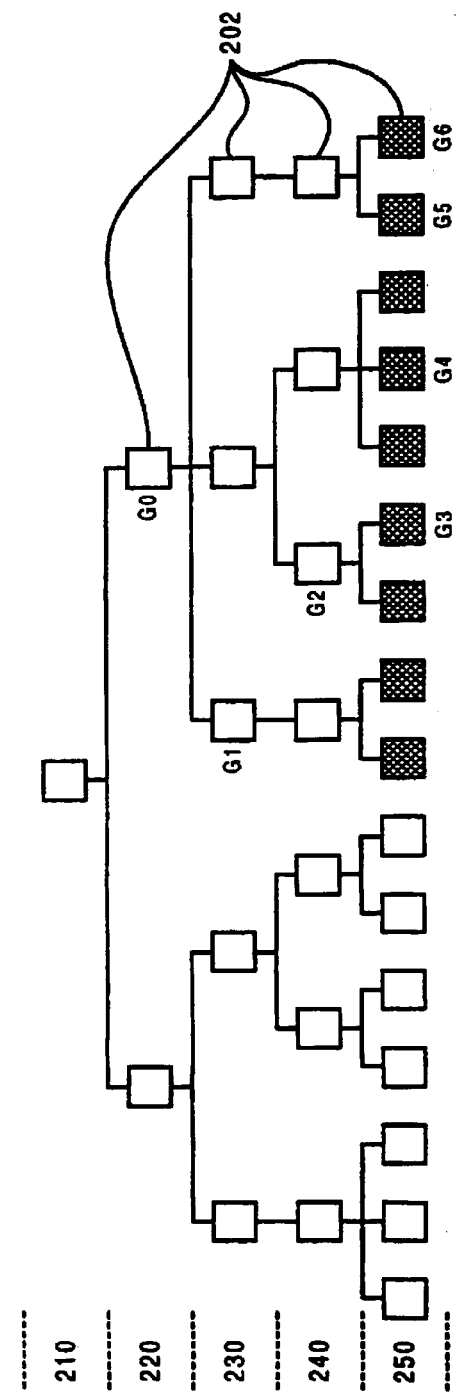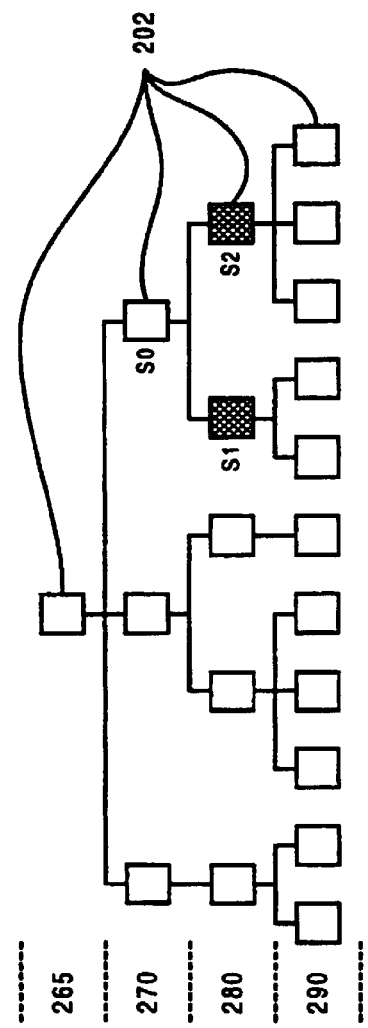
FIG. 6A
FIG. 6B

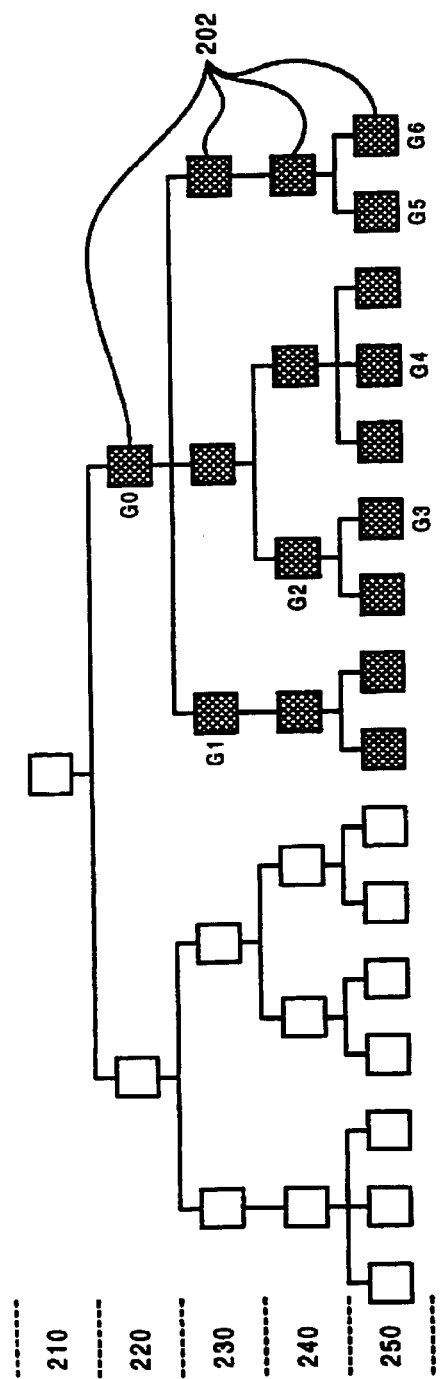
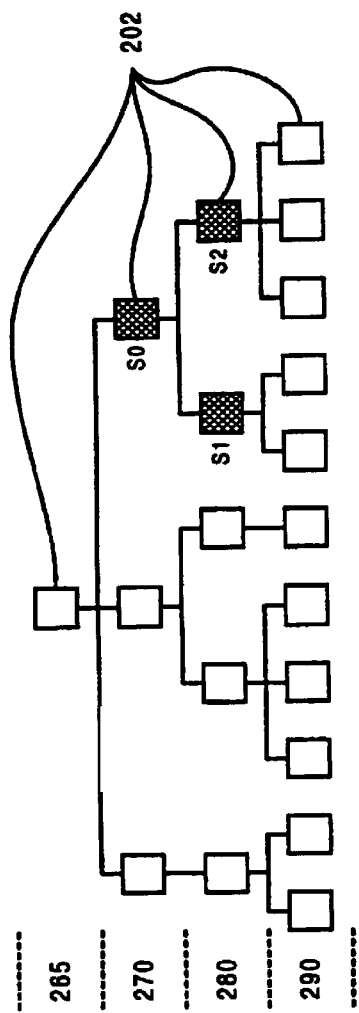
FIG. 7A
FIG. 7B

MULTI-DIMENSIONAL DATA STRUCTURE CACHING

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

FIELD

The present invention pertains generally to caches in computer-implemented databases, and more particularly to mechanisms allowing a user to specify objects to be cached in such databases.

BACKGROUND

Online analytical processing (OLAP) is a key part of most data warehouse and business analysis systems. OLAP services provide for fast analysis of multi-dimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

One of the fundamental structures used in OLAP systems is the cube. Cubes are multi-dimensional objects containing measures at specific coordinates specified by dimension members. In this context, a dimension is a structural attribute of a cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimension members act as indices for identifying a particular cell or range of cells within a multidimensional array. Each cell contains a value, also referred to as a measurement.

It is desirable for OLAP systems to provide rapid response to user queries, while maintaining the ability to store large amounts of cell data. One method used by databases and OLAP systems to provide rapid response is to provide a cache. A cache is a dedicated area of memory that is used to store the results of queries. In previous systems, the cache holds objects that have been recently accessed, or objects that are "near" objects or related to objects that have been recently accessed. The theory of operation in these previous systems is that such objects are likely to be requested by the user in the near future. By holding these objects in a dedicated memory, the system avoids having to perform "round trips" to the data store to obtain data, and further avoids having to perform exhaustive or repetitive searches of the data store.

While caches typically improve the performance OLAP systems, cache design in previous systems ignores a potentially useful input, that of the end-user or system developer. Often, the end-user or developer has knowledge regarding the data objects that will be required from the OLAP system, and in particular, which data objects will be required more often than other data objects.

Therefore, there is a need in the art for a cache system that provides a mechanism for a system user or system developer to specify how objects are to be cached.

SUMMARY

The above-mentioned shortcomings, disadvantages and problems are addressed by the present invention, which will be understood by reading and studying the following specification.

The systems and methods described herein provide a mechanism for an end-user to specify and direct the insertion of data into a database cache. One aspect of the system is that a parser operates to parse an extension to a query language that provides a means for specifying the data to be cached. The extension to the query language allows for both query level and session level control of cache insertion. The data specified by the user is retrieved from the data store, and placed in a cache based on the user's specification, allowing a user with advance knowledge of the behavior of an application to bootstrap the cache with relevant data prior to potential requests for the data by the application. This allows the end-user to insert data in the cache that might otherwise be missed by the automatic cache insertion mechanisms provided by the system, or in advance of when the automatic insertion mechanisms would have otherwise inserted the data.

A further aspect of the system is the automatic determination, based on the end-user's specification, of an appropriate set of data to cache from a multidimensional data store. The set of data is determined such that the user's specification is satisfied while minimizing expensive round-trips to the data server. The system accomplishes this by determining a maximum depth level for each user-specified set of dimension members, where the maximum depth level is the deepest level in a tree formed by a dimension hierarchy containing the dimension members. A target set of dimension members is formed comprising the set of members at the maximum level that have a common ancestor member with the members of the user-specified set. The cell data representing the Cartesian product of all of the members of each target set is then obtained and cached.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 2A and 2B are diagrams illustrating an exemplary dimension hierarchy within a multidimensional database;

FIGS. 6A and 6B are diagrams illustrating a request target level in an exemplary dimension hierarchy; and FIGS. 7A and 7B are diagrams illustrating a resultant cache coverage in an exemplary dimension hierarchy.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, an exemplary cube for an OLAP system is described. In the third section, a system level overview of an exemplary embodiment of the invention is presented. In the fourth section, methods of an exemplary embodiment of the invention are provided. Finally, in the fifth section, a conclusion of the detailed description is provided.

Hardware and Operating Environment

Figure 1:
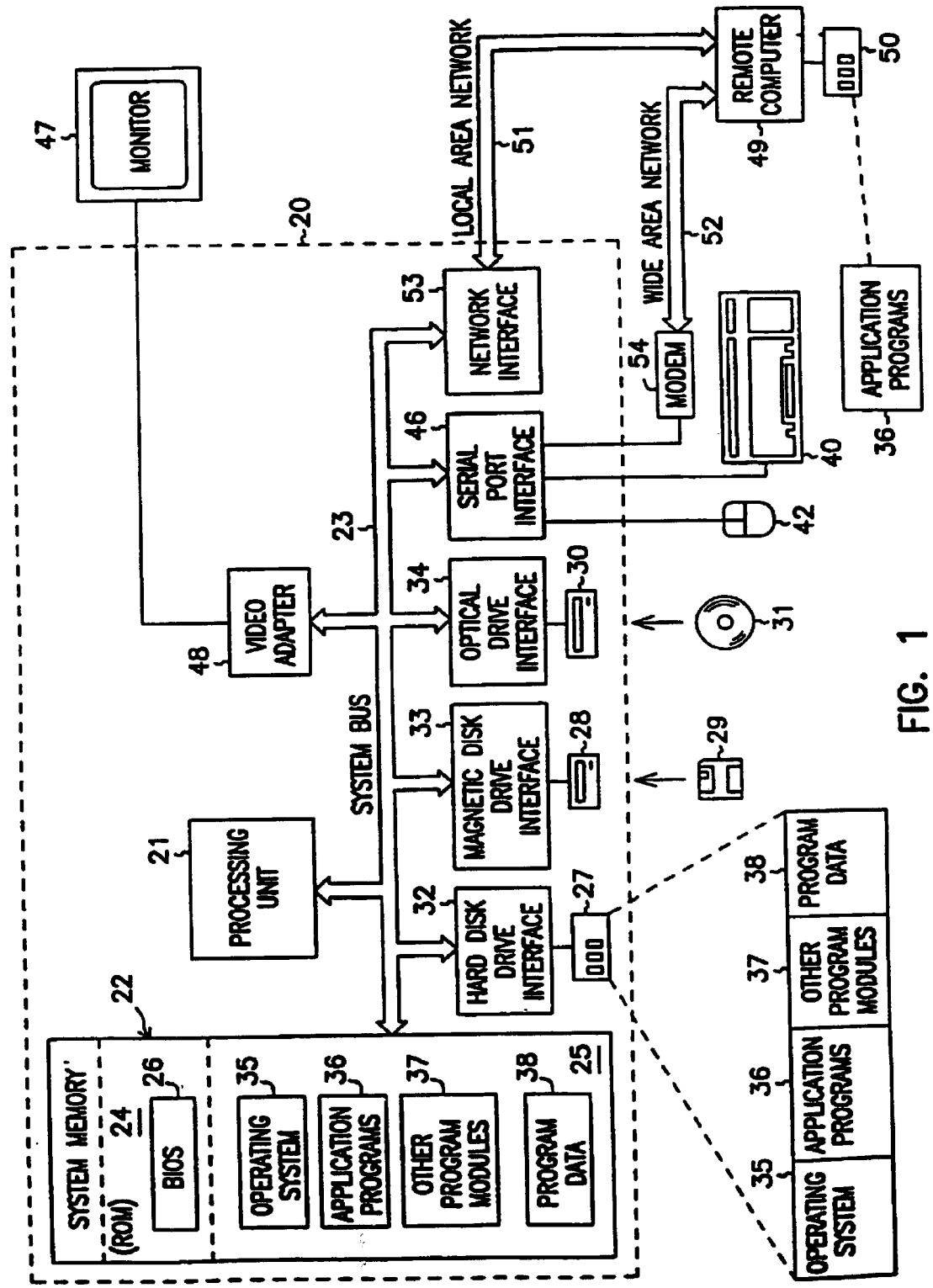
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Exemplary Cube and Dimension

In the detailed description that follows, reference will be made to a small, multi-dimensional OLAP cube. This cube has a "Geography" dimension with five levels: "All", "Country", "State", "County" and "City". The second dimension, a "Sales Representative" dimension, has four levels: "All", "Top Management", "Lower Management", and "Field". In addition, the cube has a dimension comprising the measures, such as sales volume, or product quantity, in the cube. This cube is presented to provide a reference example of how the systems and methods of the invention operate. It will be appreciated by those of skill in the art that the OLAP cubes maintained by various embodiments of the invention can have more or fewer dimensions than in this example, and that the OLAP cube can have more or fewer hierarchy levels than in this example.

A graphical representation of the dimensions in the above-described cube is presented in FIGS. 2A and 2B. In the graphical representation, a dimension is represented as a tree, referred to as a dimension tree. Leaf nodes in the tree correspond to the most detailed data in the dimension, while the inner branch nodes correspond to more aggregated data. The closer the node is to the root node, the more aggregated the data, with the root node representing the most aggregated, least detailed data in the dimension.

The Geography dimension 200 is represented in FIG. 2A. In this exemplary representation, each member of the dimension is represented by a block 202. The "All" level 210 has one member, the "Country" level 220 has two members, the "State" level 230 has five members, the "County" level 240 has seven members, and the "Cities" level 250 has sixteen members. Members joined by a line are related in hierarchical manner. For example, a member at the County level joined to a member at the State level indicates that the county represented by the County member is within the state represented by the State member.

The Sales Representative dimension 260 is represented in FIG. 2B. In the exemplary representation, the All level 265 has one member, the Top Management level 270 has three members, the Lower Management level 280 has five members, and the Field level 290 has eleven members.

The shaded members in each dimension, G1–G6, and S1–S2, are of particular interest in this representation. The shaded members represent those members that specify data that the user or system developer has determined should be placed in the cache. The determination that these members should be cached can be based on the user's prior knowledge about the expected behavior of the application accessing the OLAP system. In other words, the user has prior knowledge that data comprising tuples (i.e. member pairs (G1, S2), (G3, S1), (G6, S2) etc.) formed by the shaded members will be accessed by the application.

Those of skill in the art will appreciate that the members shown in FIGS. 2A and 2B represent an exemplary cube and that no embodiment of the invention is limited to a particular number or type of dimensions or dimension members.

This section of the detailed description has described an exemplary cube and a hierarchical representation of cells in a multidimensional OLAP database. In the sections that follow, systems and methods for pre-caching data for dimension members will be described.

System Level Overview

Figure 3:
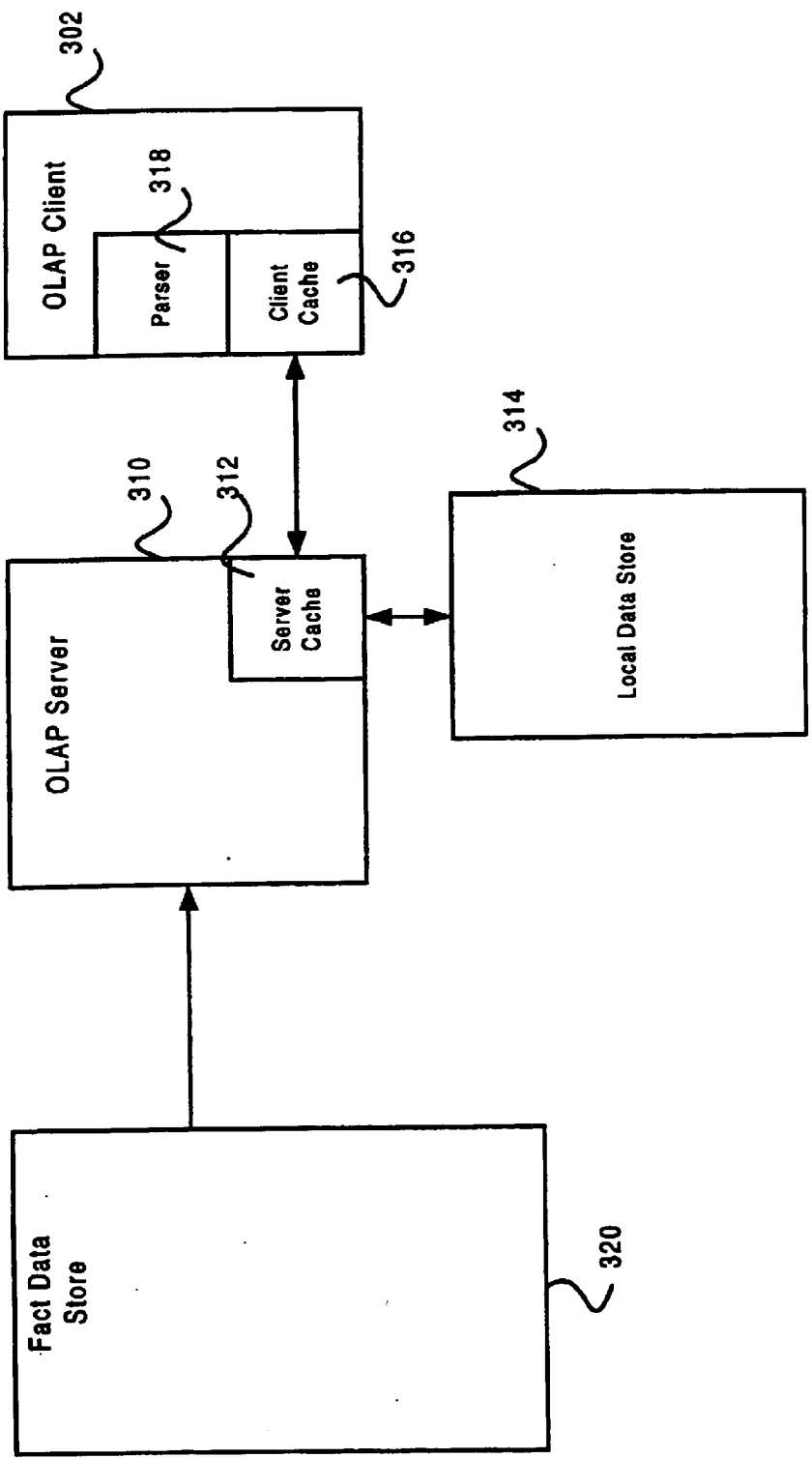
FIG. 3 is a system level overview of various embodiments of the invention.

A system level overview of the operation of an exemplary embodiment of the invention is described by reference to FIG. 3. The concepts of the invention are described as operating in a multiprocessing, multithreaded virtual memory operating environment on a computer, such as computer 20 in FIG. 1. The operating environment includes an OLAP client 302, OLAP server 310, local data store 314, and fact data store 320, all of which operate on the cell data for cubes, such as the cube described in the previous section.

OLAP client 302 is an application program that requires the services of an OLAP system. OLAP client 302 can be any type of application that interacts with the OLAP system, for example, a data mining application, a data warehousing application, a reporting application, a spreadsheet application, etc. OLAP client 302 typically interacts with OLAP server 310 by establishing a session with the OLAP server, followed by issuing OLAP queries. These queries are parsed by a query parser 318 into a request for data from a cell or range of cells, and the request is passed to the OLAP server 310. In one embodiment of the invention, query parser 318 is operable to process queries in the MDX language, however the invention is not limited to any particular OLAP or other query language.

OLAP server 310 receives the parsed queries and controls the processing of queries. In one embodiment of the invention, the server maintains a local store 314 that contains the cell data used to answer the queries. In one embodiment of the invention, the OLAP server 310 is a version of the SQL Server OLAP product from Microsoft Corporation.

The local store 314 contains records describing the cells that are present in a multidimensional database, with one record used for each cell that actually has measurement data present (i.e. no records exist for those cells having no measurement data). In one embodiment of the invention, local store 314 may be a relational database. In this embodiment, records are stored in a relational table. OLAP server 310 populates local store 314 by reading data from fact data store 320. Fact data store 320 may also be a relational database system. In one embodiment of the invention, the system used is the SQL Server™ Database from Microsoft Corporation. In alternative embodiments of the invention, database systems such as Oracle, Informix or Sybase can be used. The invention is not limited to any particular type of relational database system.

In one embodiment of the invention, the OLAP server 310 maintains a cache of cell records. The cache can either be a server side cache 312, or a client side cache 318. Maintaining a client side cache 318 is desirable, because it reduces the communications overhead between the client 302 and OLAP server 310. The cache maintains cell data records that have been recently requested, or those cell data records that are frequently requested.

In one embodiment of the invention, the cache also maintains cell data records as specified by the end-user using the query language. In this embodiment, the query language parsed by query parser 318, such as the MDX language, provides statements for cache control at both the query level and the session level. The syntax extension to the MDX language used to specify cache control can be expressed in BNF form. The BNF notation is used by those of skill in the art to specify language syntax. At the query level the BNF form for the language extension is as follows:

<select_statement>::=WITH<sel_cache_list>SELECT<select_body>

```
<sel_cache_list>::=<sel_cache>[<sel_cache>[<sel_
    cache> . . . ]]
<sel_cache>::=CACHE AS'(<set₁>, . . . , <setₙ>)'
```
The syntax extension at the session level is as follows:
```
<create_statement>::=CREATE<cr_cache_list>
<cr_cache_list>::=<cr_cache>[<cr_cache>[<cr_
    cache> . . . ]]
<cr_cache>::=CACHE FOR<cube>AS'(<set₁>, . . . ,
    <setₙ>)'
```
As can be seen from the above, the <sel_cache>(cache auto-created in SELECT statements) and <cr_cache> (caches explicitly created in CREATE statements) can be repeated as many times as the end-user wants inside a single statement. Also, cache constructions can be interleaved with calculated formula/sets (which can appear in the WITH clause or in the CREATE statement. The invention is not limited to the syntax specified above, and those of skill in the art will appreciate that alternative language syntax could be used to specify members to be cached.

Thus, when the end-user knows the members along each dimension that will be accessed, the end-user specifies the members to be cached as a list of sets, and formulates an appropriate MDX language statement containing the list of sets. For the example presented above in reference to FIGS. 2A and 2B, there are two sets, one containing members of the Geography dimension and one containing members of the Sales Representative dimension: ({[G1], [G2], [G3], [G4], [G5]}, {[S1], [S2]}). The statement is parsed by the parser 318, and the data specified by all possible combinations of members from each set is obtained from OLAP server 310. The resultant data is placed in a cache, either a server side cache 312 or a client side cache 316. The data is then available for use in subsequent queries, without the need for performing round-trips to the server and without the need to rescan the local data store 314 for the cached data.

This section has described the major components of a system according to an embodiment of the invention, including a syntax extension for a query language utilized by the embodiment.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 4 and 5. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 4 and 5 are inclusive of the acts required to be taken by an operating environment executing an exemplary embodiment of the invention.

Figure 4:
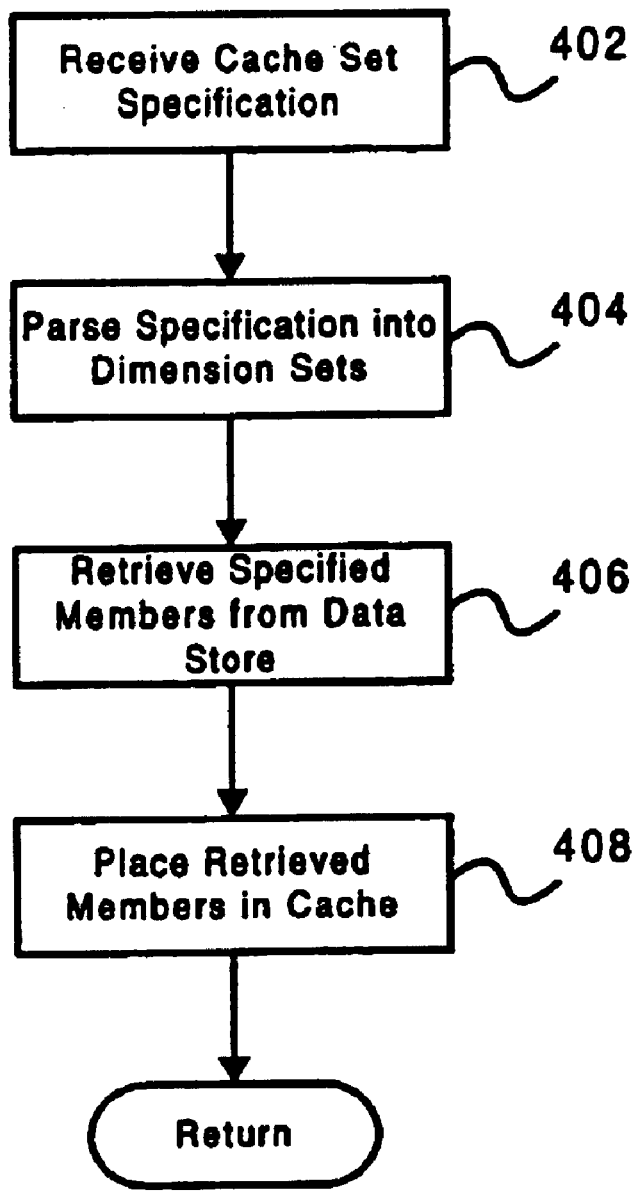
FIG. 4 is a flowchart illustrating a method for inserting data into a cache according to an embodiment of the invention.
Figure 5:
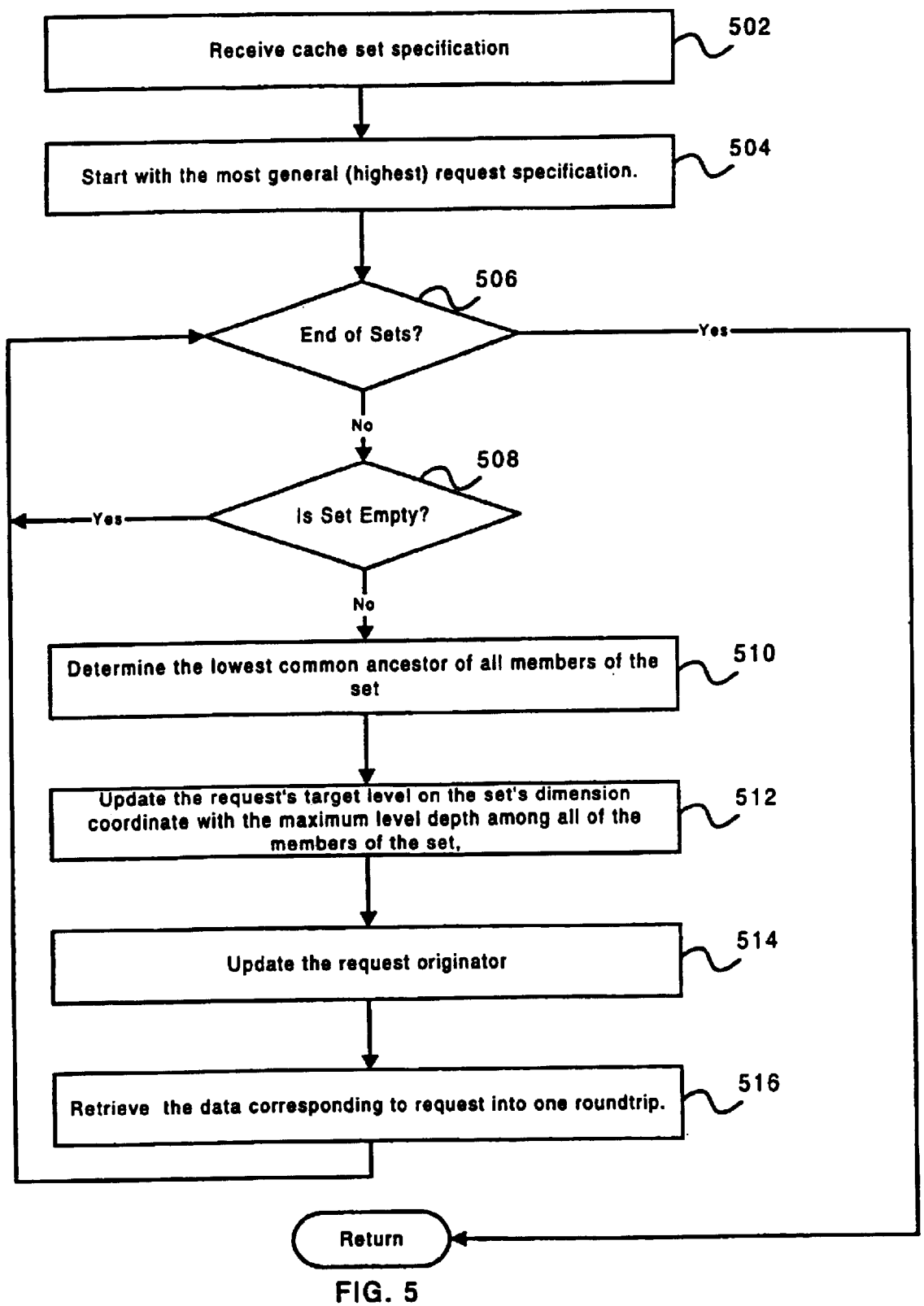
FIG. 5 is a flowchart illustrating a method for inserting data into a cache according to an alternative embodiment of the invention.

A method for caching OLAP cell data is illustrated in FIG. 4. The method begins when a program executing the method, such as OLAP client 302, receives a specification for a set of member tuples to cache (block 402). In one embodiment of the invention, the specification is supplied as part of the OLAP query language, as described in the previous section. However, the invention is not so limited, and in an alternative embodiment of the invention, the specification of member tuples is provided by API (Application Program Interface) calls. The methods implementing the API can reside in a library that is linked with a client program. The developer can make calls to the API methods from within the client program to specify the member tuples to be cached.

Next, the program executing the method parses the set specification to create a multi-dimensional subspace defined by the Cartesian, or cross product of all of the members in the specified sets (block 404). For example, given the member sets describe above in reference to FIG. 2A, that is ({[31], [G2], [G3], [G4], [G5]}, {[S1], [S2]}), the corresponding tuples in the cached set would be (G1, S1), (G1, S2), (G2, S1), (G2, S2) . . . (G5, S1) and (G5, S2). In other words, each possible member combination in the specified member sets is included in the cache.

Next, a program executing the method then retrieves the cells specified by the members determined at block 404 from the data store (block 406). These cells are placed in the cache for later use by the application (block 408). As described above, the cache can be a local cache maintained within the client program's memory space, or the cache can be a server side cache maintained by the OLAP server program.

In the method described above, the program executing the method retrieves exactly the cells situated in the multidimensional space specified by the end-user. However, FIG. 5 describes a method according to an alternative embodiment of the invention providing an optimization that allows for a whole sub-pyramid of the multidimensional space to be cached based on a minimum set of data.

Like the method described above, the method shown in FIG. 5 begins when a program executing the method receives a specification for a set of member tuples to cache (block 502). It is desirable that the specified sets be monodimensional and orthogonal (i.e. containing only 1-tuples and whose dimensions are two-by-two distinct, respectively). The specified sets are then parsed into dimension sets, and the most general, i.e. highest, request specification is selected (block 504). The highest request specification is the request closest to the top of the tree formed by the dimension members.

Next, block 506 is the top of a loop that is executed for each of the sets in the specification. For each of the sets in the specification, blocks 508 to blocks 516 are executed. First, a check is made to see if the set is empty (block 506). If the set is empty, the method returns to the top of the loop to get the next set of dimension members.

If the set is not empty, the program executing the method proceeds to determine the lowest common ancestor of all the members in the set (block 510). The lowest common ancestor is the single member in the dimension tree at the most detailed level that is common to all of the members in the set specification. In the example represented in FIGS. 2A and 2B, members G0 and S0 are the lowest common ancestors in their respective dimensions for the example set specified above.

Next, the program executing the method determines the request target level (block 512). The request target level is the dimension level that is the maximum level depth among all of the members specified in the dimension set. FIGS. 6A and 6B provide a pictorial representation of an exemplary request target level formed using the exemplary set specification discussed above. FIG. 6A shows the request target level for the Geography dimension. The program determines that level 250 is the request target level for the Geography dimension, because the members G3, G4, G5 and G6 are the members in the set specification at the maximum level. Similarly, FIG. 6B shows the request target level for the Sales dimension. The program executing the method determines that level 280 is the request target level for the Sales Representative dimension, because the members S1 and S2 are the members in the set specification at the maximum level.

Returning to FIG. 5, after the request target level has been determined, the program executing the method updates the request originator to include all members of the dimension tree that are at the request target level and that share the lowest common ancestor (block 514). This is graphically represented by the shaded members in FIGS. 6A and 6B. The members determined at this block (the shaded members) can be referred to as a "frame" of the dimension tree.

Finally, the program executing the method retrieves the data corresponding to the request in a single round-trip to the OLAP server (block 516). The selected data comprises a multidimensional subspace defined by the Cartesian product of the members of each of the target sets determined above. This multidimensional space is filled with data from the OLAP data source. The retrieved cell data is then placed in the cache.

As discussed above, the cache can be a server side cache or a client side cache. In the case of a server side cache, the data is retrieved in a single compact retrieval and registered as a single (big) cache instead of many smaller chunks, thereby avoiding cache fragmentation.

After the data has been placed in the cache, it can be provided to applications issuing queries that are satisfied by the cached data, thereby avoiding round-trips to the server As described above, the members in the frame that are used to retrieve and cache cell data reside on one level of each of the dimension trees. However, in effect, a much broader set of member data is effectively cached. This is because the members in the frame can be used to derive member data for members at higher, i.e. less detailed, levels in the tree. The more detailed members in the frame can be aggregated together to recreate the member data for the upper less detailed members. For example, members G1 and G2 can be determined using the data provided by aggregating their respective descendant members at the lower, more detailed levels. The actual member coverage is referred to as a "slice" of the dimension tree. The projection of the slice on dimensions of the set comprises the "common set of complete descendants", i.e. the descendants of the lowest common ancestor at the deepest level present in the set. The dimension slices for the Geography and Sales Representative dimension created using the example dimension set specifications of({G1, G2, G3, G4, G5, G6}, {S1, S2}) are illustrated in FIGS. 7A and 7B respectively. In FIGS. 7A and 7B, the shaded members represent the members of the slice. The actual data coverage extended using this technique is called a virtual pyramid. The actual data coverage is the multidimensional range of the Cartesian product of the shaded members of each of the dimensions, from the target level to the lowest common ancestor level.

The methods presented in FIGS. 4 and 5 above have been described in reference to a single multidimensional cube. However, in an alternative embodiment of the invention, the methods can be applied to what is known as a virtual cube. Virtual cubes are cubes that appear to the end-user as a single cube, but in actuality are comprised of more than one cube. Further details on the design and operation of virtual cubes can be found in U.S. patent application Ser. No. 09/337,828, entitled "Virtual Cubes", which is hereby incorporated by reference herein. In the case of a virtual cube, the methods described above are applied to each of the physical cubes comprising the virtual cube.

Conclusion

The user-specified insertion of cache data has been described. The systems and methods of the invention provide advantages not found in previous systems. For example, The systems and methods of embodiments of the invention provides and end user of a multidimensional database server the opportunity to fine-tune an application by providing a means for directly controlling the cache used for queries. The embodiments of the invention provide a mechanism for bootstrapping a cache system in advance and to take advantage of knowledge the end-user has about the behavior of the application and its effect on the cache system.

A further advantage of an embodiment of the invention is the implementation of a best-request algorithm to determine the set of "best" data that should be requested that both serves the user's cache request and maximizes the benefits with minimum of overhead (i.e. roundtrips to the database server).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the systems and methods have been described in the context of a multidimensional database system, the systems and method of the invention can be applied to systems that rely on caching to improve performance. By way of illustration, the systems and methods can be applied to a relational database system, or a virtual memory system. The terminology used in this application with respect creating and maintaining cell records is meant to include all of these environments. Therefore, it is manifestly intended that this invention be limited only by the following claims and equivalents thereof.

We claim:

1. A computerized method for inserting an object into a database cache, the method comprising:
    receiving a user-generated specification of a set of objects to cache;
    retrieving the set of objects from a data store; and
    inserting the set of objects into the database cache.

2. The computerized method of claim 1, wherein receiving a specification includes parsing the specification from a query statement in accordance with a query language for a database system.

3. The computerized method of claim 1, wherein receiving a specification includes parsing the specification from a parameter provided in a function call.

4. The computerized method of claim 1, wherein the database is a multi-dimensional database.

5. The computerized method of claim 1, wherein the database cache is an OLAP server cache.

6. The computerized method of claim 1, wherein the database cache is an OLAP client cache.

7. A computerized method for determining an object to insert into a multi-dimensional database cache, the method comprising:
    receiving a specification for at least one set of dimension members, the at least one set of members belonging to a dimension having a hierarchy of levels;
    for each of the at least one sets performing the tasks of:
        determining a lowest common ancestor member for the set;
        determining a maximum depth level for the members in the set; and
        determining a target set of members, the target set comprising members that are both at the maximum depth level and a descendant of the lowest common ancestor member of the set;
    retrieving a cross product of cell data specified by each of the target sets; and inserting the cross product of cell data into a cache.

8. The method of claim 7, wherein the multidimensional database cache is an OLAP server cache.

9. The method of claim 7, wherein the multidimensional database cache is an OLAP client cache.

10. The method of claim 7, wherein receiving a specification includes parsing the specification from a query statement in accordance with a query language for a database system.

11. The computerized method of claim 7, wherein receiving a specification includes parsing the specification from a parameter provided in a function call.

12. A computerized system comprising:
   a processor and a computer-readable medium;
   an operating environment executing on the processor from the computer-readable medium;
   a multidimensional database client executing under the control of the operating environment;
   a multidimensional database cache; and
   a parser component executed within the client and operative to perform the tasks of:
      receiving a user-generated specification of a set of objects to cache;
      retrieving the set of objects from a data store; and
      inserting the set of objects into the database cache.

13. The computerized system of claim 12, wherein multidimensional database cache is maintained by the client.

14. The computerized system of claim 12, wherein multidimensional database cache is maintained by a multidimensional database server.

15. The computerized system of claim 14, wherein the multidimensional database server is an OLAP server.

16. A computer-readable medium having computer-executable instructions for performing a method comprising:
   receiving a user-generated specification of a set of objects to cache;
   retrieving the set of objects from a data store; and
   inserting the set of objects into the database cache.

17. The computer-readable medium of claim 16, wherein receiving a specification includes parsing the specification from a query statement in accordance with a query language for a database system.

18. The computer-readable medium of claim 16, wherein receiving a specification includes parsing the specification from a parameter provided in a function call.

19. The computer-readable medium of claim 16, wherein the database is a multidimensional database.

20. The computer-readable medium of claim 16, wherein the database cache is an OLAP server cache.

21. The computer-readable medium of claim 16, wherein the database cache is an OLAP client cache.

22. A computer-readable medium having computer-executable instructions for performing a method for determining an object to insert into a multidimensional database cache, the method comprising:
   receiving a specification for at least one set of dimension members, the at least one set of members belonging to a dimension having a hierarchy of levels;
   for each of the at least one sets performing the tasks of:
      determining a lowest common ancestor member for the set;
      determining a maximum depth level for the members in the set; and
      determining a target set of members, the target set comprising members that are both at the maximum depth level and a descendant of the lowest common ancestor member of the set;
   retrieving a cross product of cell data specified by each of the target sets; and
   inserting the cross product of cell data into a cache.

23. The computer-readable medium of claim 22, wherein the multidimensional database cache is an OLAP server cache.

24. The computer-readable medium of claim 22, wherein the multidimensional database cache is an OLAP client cache.

25. The computer-readable medium of claim 22, wherein receiving a specification includes parsing the specification from a query statement in accordance with a query language for a database system.

26. The computer-readable medium of claim 22, wherein receiving a specification includes parsing the specification from a parameter provided in a function call.

27. A computer-readable medium having executable instructions encoded thereon to perform at least a method comprising:
   receiving at least one of either a user-generated query identifying a set of objects to cache for later use or an API call that specifically identifies a set of objects to cache for later use, the identification of objects in the API call having originated from a user-generated specification;
   receiving the set of objects that have been retrieved from a data store; and
   inserting the set of objects in a database cache.

28. The computer-readable medium of claim 27, wherein the database is a multidimensional database.

29. The computer-readable medium of claim 27, wherein the database cache is an OLAP server cache.

30. The computer-readable medium of claim 27, wherein the database cache is an OLAP client cache.

* * * * *